Figure 1:
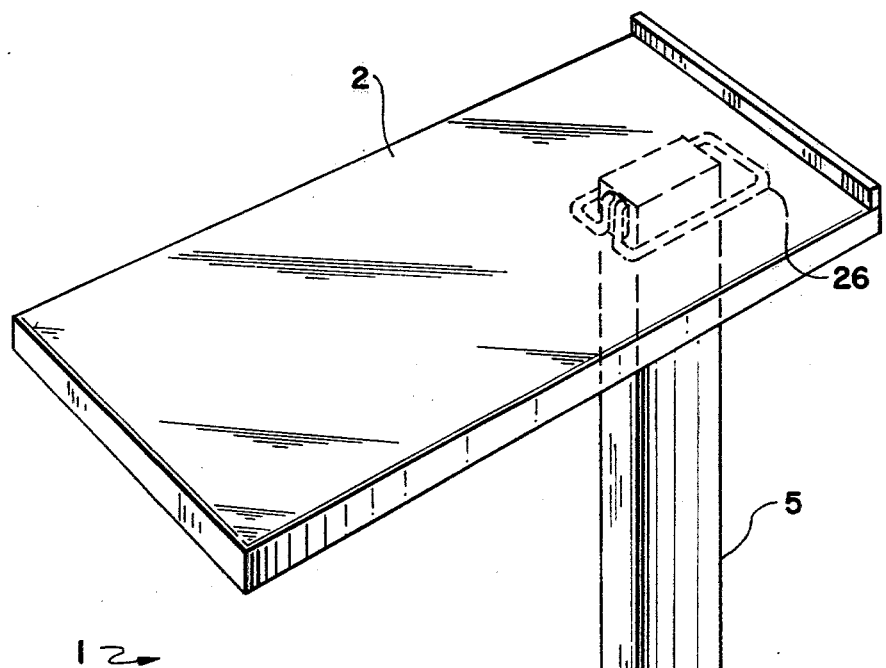
Figure 1:
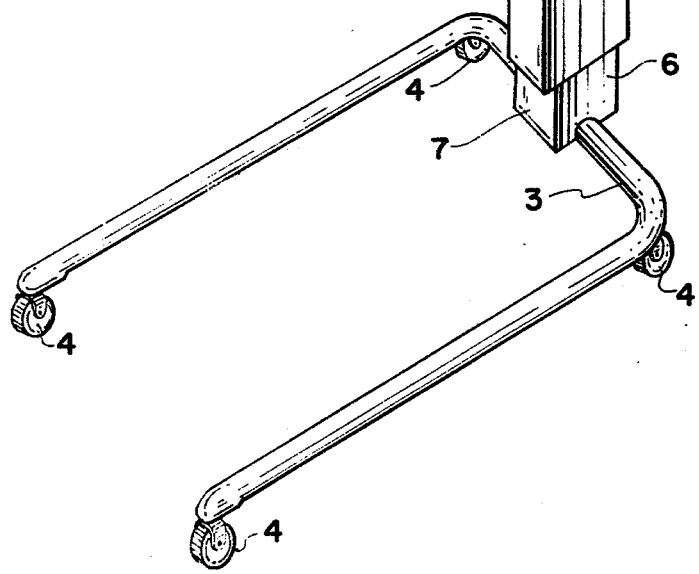

United States Patent [19]

Benoit et al.

[11] 4,195,578
[45] Apr. 1, 1980

[54] EXTENSIBLE SUPPORT ASSEMBLY FOR OVERBED TABLE

[75] Inventors: Roland A. Benoit; Edmund P. Guillot, both of Danielson, Conn.

[73] Assignee: Interroyal Corporation, New York, N.Y.

[21] Appl. No.: 933,239

[22] Filed: Aug. 14, 1978

[51] Int. Cl.² .................. A47B 9/00; F16M 11/24
[52] U.S. Cl. .................. 108/144; 108/146; 248/412
[58] Field of Search ............ 108/147, 144, 146, 148, 108/7; 248/412, 411; 403/109, 368

[56] References Cited

U.S. PATENT DOCUMENTS

| 3,194,187 | 7/1965 | Linder et al. | 108/146 |
| 3,286,663 | 11/1966 | Mann et al. | 108/144 |
| 3,715,997 | 2/1973 | Barth | 248/412 X |
| 3,887,155 | 6/1975 | Bertalot | 108/144 X |
| 3,905,311 | 9/1975 | Carpentier | 108/144 |

FOREIGN PATENT DOCUMENTS

| 2305928 | 8/1974 | Fed. Rep. of Germany | 403/109 |
| 2647664 | 12/1977 | Fed. Rep. of Germany | 403/109 |

Primary Examiner—James T. McCall

[57] ABSTRACT

Extensible support assembly for a table such as an overbed table to interconnect the top table portion and bottom stand portion thereof to change the table height, including a pair of axially overlapping upper and lower vertical support members arranged for relative axial movement therebetween, and a releasable unidirectional jamming mechanism interposed between the members having an inclined wedge surface on the upper member in opposed relation to a substantially axially extending contact surface on the lower member and forming a jamming wedge zone with the contact surface, a movable jamming roller element disposed in the jamming wedge zone, and a movable release element disposed operatively adjacent to the jamming element,
  such that the jamming element is movable independently of the wedge surface, contact surface and release element and is normally resiliently biased by a spring or the like independently of the release element into unidirectional jamming engagement between the wedge surface and contact surface for jamming the members against further corresponding relative movement, e.g. to decrease the table height, and furthermore such that the release element is similarly movable independently of the jamming element for releasably urging the jamming element out of such unilateral jamming engagement to permit further corresponding relative movement between the members, and
preferably with antifriction guide bearing structures removably carried on the members for mounting various parts of the assembly thereat and forming corresponding removable units to facilitate assembly and disassembly of such parts.

25 Claims, 3 Drawing Figures

EXTENSIBLE SUPPORT ASSEMBLY FOR OVERBED TABLE

The present invention relates to an extensible support assembly, and more particularly to such an assembly of changeable length for interconnecting the table top portion and bottom stand portion of a table, especially an overbed table, to change the table height, and including special means for releasably unidirectionally jamming the extensible support assembly against further change in length and corresponding change in table height.

Vertically adjustable tables, especially those in the form of cantilevered overbed tables for use by patients in hospital beds, are known. These extensible tables contain various mechanisms to lock the extensible parts of the table against further movement, usually to prevent undesired decrease in table height.

Thus, U.S. Pat. No. 3,675,597 (Oddsen et al) shows an adjustable table top support for the usual type table in the form of a pair of inner and outer telescoping members containing means for outwardly urging a specially constituted displaceable bottom portion of the inner member directly against the outer member to lock the members against relative movement at a selected table height.

U.S. Pat. Nos. 3,905,311 (Carpentier) and 3,890,907 (Peterson) show a complex and expensive clutch operated pulley and cable mechanism mounted between a pair of telescoping members in an overbed table arrangement to lock the members against relative movement at a selected table height. U.S. Pat. No. 3,194,187 (Linder et al) achieves similar results using a complex and expensive rack and gear mechanism operatively mounted between the overbed table telescoping members which is lockable by moving a lock member into stopping engagement with the gear.

U.S. Pat. No. 3,380,405 (Barecki et al) shows a complex and expensive construction which locks the telescoping members of an overbed table arrangement against relative movement by urging a toothed latch bar pivoted on the outer member against a vertical bar on the inner member. U.S. Pat. No. 3,854,428 (Fullenkamp) shows a like complex and expensive construction in which a pawl pivoted on the outer member engages a rack on the inner member to lock the overbed table telescoping members against relative movement. On the other hand, U.S. Pat. No. 3,999,492 (Emrick) uses a cam carried on a specially shaped leaf spring pivotally mounted via a horizontal seating pin on the inner member to engage against the wall of the outer member to lock the overbed table telescoping members against relative movement.

U.S. Pat. Nos. 3,188,986 (La Vigne); 3,310,008 (Pruim et al); and 3,314,384 (Mann et al); all concern complex and expensive constructions for locking the telescoping members of corresponding overbed table arrangements in which a rod attached to one of the members is inserted through an aperture in a plate attached to the other of the members, such that by rocking the plate against the rod, the friction contact at the plate aperture holds the members against further relative movement. U.S. Pat. No. 3,481,286 (LaMar et al) concerns a similar locking mechanism for the overbed table telescoping members in which the plate is urged into frictional contact with the rod by a complex and expensive construction utilizing a special eccentric frustoconical camming action.

On the other hand, U.S. Pat. No. 3,715,997 (Barth) shows a construction which releasably locks the telescoping members of such an overbed table arrangement by means of a locking rod or cylinder captively held between overlying flange and underlying edge portions of an upwardly spring biased control rod carried on the outer member for downward and upward movement to permit wedging engagement of the locking rod upwardly between a wedge block fixed on the outer member and the opposing wall portion of the inner member, and its release by downward movement of the control rod. However, the locking rod is not movable independently of the control rod and the arrangement requires the normal upward spring biasing force of the control rod transmitted via the edge portion of the control rod captively underlying the locking rod or cylinder to maintain the locking rod or cylinder in the desired position to effect the wedging engagement sought.

It is among the objects and advantages of the present invention to overcome the drawbacks and deficiencies of the prior art and to provide an extensible support assembly, especially one adapted to be incorporated in a table assembly or the like, such as an overbed table assembly, which contains specially constituted releasable unidirectional jamming means and which is simple, durable and inexpensive in construction, as well as readily fabricated from commercially available parts and materials using conventional steps and equipment with minimum modification, and convenient, sure and safe in use.

It is among the additional objects and advantages of the present invention to provide an assembly of the foregoing type which may be easily and economically assembled initially as well as dissassembled for repair and servicing when in use, which is long-lasting and stable in operation, and which also permits the incorporation in the assembly of supplemental mechanisms by use of functionally efficient mounting components readily adaptable to the constructional confines of the assembly.

Figures 2, 3:
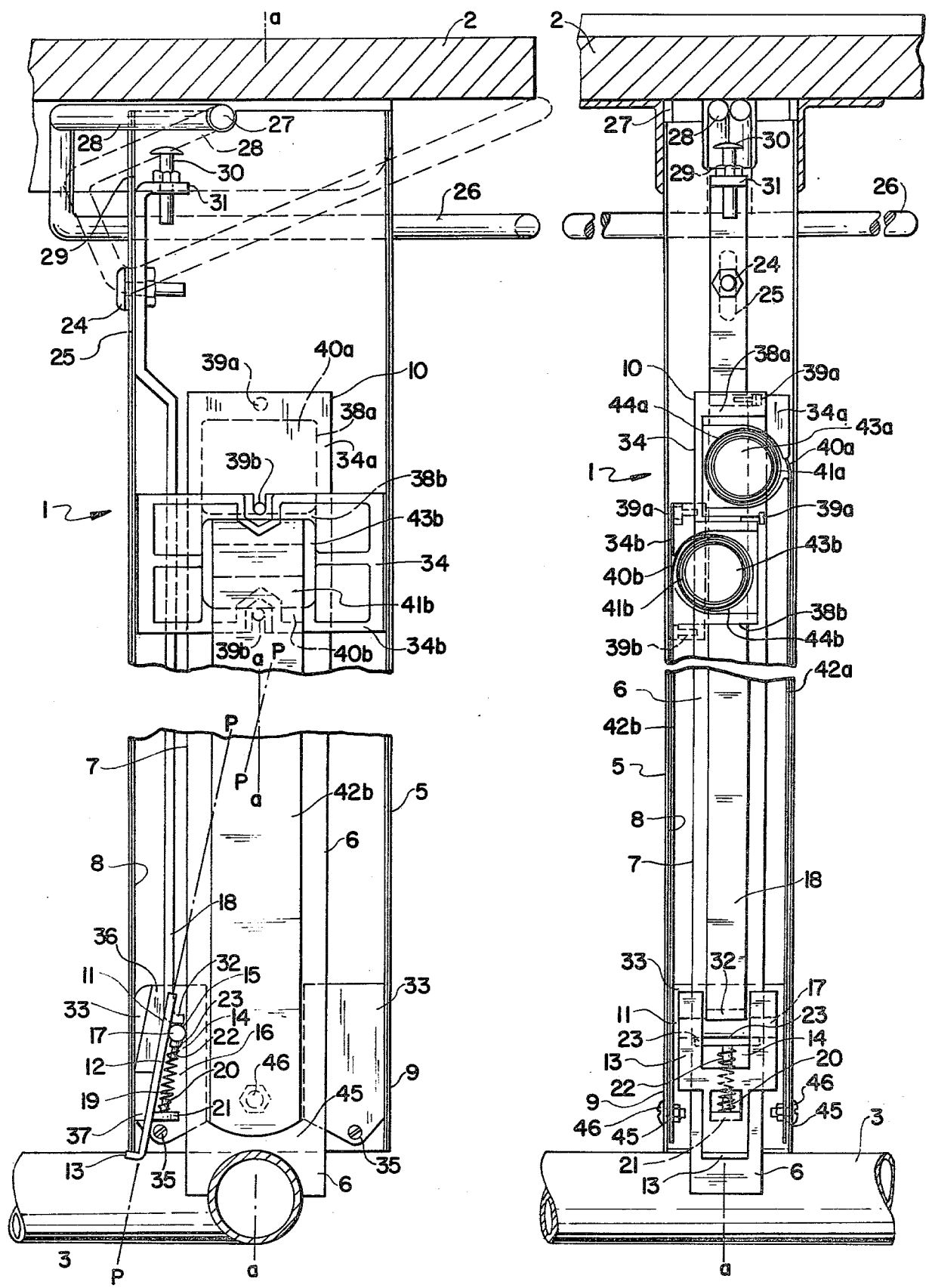

Other and further objects and advantages of the present invention will become apparent from a study of the within specification and accompanying drawings, in which:

FIG. 1 is a schematic perspective view on a reduced scale of an overbed table in which the extensible support assembly of the invention is incorporated in accordance with an embodiment of the invention, FIG. 2 is a schematic partially sectional side elevational view of the table of FIG. 1 showing details of construction of the releasable unidirectional jamming mechanism operatively interposed between the telescoping support members according to the invention, and FIG. 3 is a schematic partially sectional end elevational view of the table of FIG. 1 showing further details of construction including antifriction guide bearing means and constant force spring means operatively interposed between the telescoping members.

According to the present invention, an extensible support assembly is broadly contemplated, of the type preferably adapted to be incorporated in a table assembly or the like, which comprises a pair of cooperating axially overlapping support members arranged, e.g. vertically, for relative axial movement therebetween to change their overlapping extent and in turn their overall effective length, in combination with releasable unidirectional jamming means specially operatively interposed between the members for coaction with a substantially axially extending contact surface on one of the members, e.g. the lower member.

The releasable unidirectional jamming means includes an inclined wedge surface on the other of the members, e.g. the upper member, situated generally in a plane angularly crosswise of the axis of the members and in opposed relation to the contact surface on such one or lower member. This wedge surface forms a jamming wedge zone with the contact surface in any selective overlapping position of relative movement of the members. The releasable jamming means also includes a specifically movable jamming element disposed operatively in the jamming wedge zone and a specifically movable release element disposed operatively adjacent to the jamming element.

The jamming element is specially arranged so that it is advantageously movable independently of the wedge surface, contact surface and release element, and also so that it is normally resiliently biased independently of the release element into unidirectional jamming engagement between the wedge surface and the contact surface for jamming the members against further corresponding relative movement therebetween.

Moreover, the release element is specially arranged so that it is advantageously movable for releasably urging the jamming element out of such unilateral jamming engagement to permit further corresponding relative movement between the members.

The members are preferably disposed in telescoping relation and the jamming element may be readily provided in the effective form of a jamming roller element or cylinder element. The members may be suitably provided with opposed antifriction bearing means on their corresponding facing end portions, operatively interposed between the members thereat for suitably guiding the members for smooth relative axial movement.

In accordance with one particular feature of the invention, the wedge surface and jamming element may be suitably mounted on the guide means on one of the facing end portions, e.g. on the upper member.

Furthermore, substantially constant force coil spring means, such as negator springs, may be operatively interposed between the members for maintaining the members in counterbalancing relation in any overlapping position of movement therebetween. This will advantageously permit adjustment of the overall effective length of the members to be readily achieved with minimum effort upon release of the jamming means. Such constant force coil spring means correspondingly have a coil end and a free end, and the corresponding free end is readily mounted at such one of the facing end portions, e.g. on the upper member, while the corresponding coil end is readily mounted on the guide means on the other of the facing end portions, e.g. on the lower member, such as by the provision for receiving means, e.g. a receptacle, in such guide means.

Conveniently, the opposed guide means may be removably mounted as corresponding units on the members to facilitate assembly and disassembly of the wedge surface and jamming element on the guide means on such one of the facing end portions, e.g. on the upper member, and of the corresponding coil end of the coil spring means at the other of the facing end portions, e.g. on the lower member. Hence, the coil spring means may include a pair of remotely facing substantially constant force coil springs, with their corresponding coil ends operatively received respectively in an appropriate pair of remotely facing receptacles on the associated guide means, e.g. on the lower member, and with their corresponding free ends operatively mounted respectively on an appropriate pair of opposed mounting seats on such one of the facing end portions, e.g. on the upper member.

Advantageously, resilient biasing means, such as biasing spring means carried on such other of the members, e.g. the upper member, are disposed in the jamming wedge zone for normally resiliently biasing the jamming element as desired. Carrier means may be disposed on the biasing spring means for displaceably carrying the jamming element, e.g. for suitable independent rotational movement of the jamming element with respect to the carrier means and for conjoint linear movement of the jamming element and the carrier means correspondingly for moving the jamming element into the stated engagement under the force of the biasing spring and out of such engagement under the releasable urging counterforce of the release element.

Thus, the jamming element is advantageously disposed to prevent relative movement of the other of the members, e.g. the upper member, in an axial direction from the corresponding inward apex portion of the jamming wedge zone to the corresponding outward base portion thereof. It will thereby prevent further relative movement of the members in a direction of increasing overlapping extent and in turn of decreasing overall effective length.

The release element may be readily displaceably mounted on the member containing the wedge surface, e.g. the upper member, for axial movement relative to such member, e.g. by means of a handle also disposed on such member and operatively arranged relative to the release element. Specifically, the release element may be moved by the handle independently of the jamming element and the biasing spring means for urging the jamming element out of the stated engagement. A thrust surface located at the end portion of the release element adjacent to the jamming element, e.g. at the apex portion of the jamming wedge zone and in overlying contact relation to the jamming element in the direction of such apex portion, may be effectively provided for releasably urging the jamming element out of such engagement when the handle is operated.

According to a preferred execution of the invention, an overbed high-low table assembly is contemplated having a top table portion and a bottom stand portion substantially vertically interconnected by a pair of cooperating upper and lower vertical telescoping support members of the stated type arranged for relative axial movement therebetween to change their overlapping extent and in turn their overall effective length and the corresponding height of the table, with the upper member being the outer member and having the wedge surface and also carrying the table top portion thereon, and with the lower member being the inner member and having the stated contact surface and also being carried on the bottom stand portion.

Referring to the drawings, FIG. 1 shows a typical overbed table assembly 1 having a top table portion 2 and a bottom stand portion 3, equipped with casters or the like 4, vertically interconnected by a pair of cooperating upper and lower vertical telescoping support members 5 and 6. Upper member 5 which carries table portion 2 thereon is the outer member and lower member 6 which is carried on stand portion 3 is the inner member, although it will be appreciated that the reverse orientation of these members may also be employed as desired. Members 5 and 6 are arranged for relative axial movement, here vertical movement, to change their overlapping extent and in turn their overall effective length and the corresponding height of the table.

As shown more clearly in FIGS. 2 and 3, inner member 6 is provided with an axially extending contact surface 7 thereon which is in laterally opposed facing relation to the axially extending interior wall 8 of outer member 5. Outer member 5 is thus arranged with respect to inner member 6 to define a sufficient clearance gap therebetween for relative displacement of the members such that the downwardly facing end portion 9 of outer member 5 is situated in axially opposed relation to the upwardly facing end portion 10 of inner member 6. The axial distance between facing end portions 9 and 10 accordingly defines the extent of overlap of the members.

According to the invention, specific releasable unidirectional jamming means 11 are operatively interposed between the members. Jamming means 11 includes an inclined or tapered wedge surface 12 on a more or less tapered, preferably U-shaped, wedge plate 13, maintained in abutment with the bottom edge of outer member facing end portion 9. Wedge surface 12 is situated generally in a plane p angularly crosswise of the axis a of the members and in opposed relation to contact surface 7. Thus, wedge surface 12 forms a jamming wedge zone 14 with contact surface 7 having an upwardly directed inward apex portion 15 and a downwardly directed outward base portion 16 in any selective overlapping position of relative axial movement of the members.

Jamming means 11 also includes a movable jamming element 17, e.g. a jamming roller element such as a cylinder, disposed operatively in the jamming wedge zone 14, and a movable release element 18 disposed operatively adjacent to the jamming element 17.

Jamming element 17 is normally resiliently directly biased independently of release element 18 upwardly into unidirectional jamming engagement in direct contact between wedge surface 12 and contact surface 7 by resilient biasing means such as biasing spring means 19, preferably in the form of an axially deformable coil spring or the like, carried via an upstanding lug 20 on a tab 21 rigidly extending transversely from the main body of wedge plate 13. Carrier means 22, for instance in the form of a T shaped shoe or slide having a curved slide surface type crosshead 23, is disposed on biasing spring means 19 for displaceably carrying jamming element 17 for independent rotational movement with respect thereto and for conjoint upward and downward linear movement therewith. In this way, jamming element 17 is independently movable into unidirectional jamming engagement between wedge surface 12 and contact surface 7 under the independent force of biasing spring means 19 and in turn out of such engagement under the releasably urging counterforce of release element 18.

Release element 18 is displaceably mounted on upper or outer member 5 via a pin 24 guided in a vertical slot 25 in the adjacent wall portion at the upper end of member 5 and attached to release element 18. Downward movement of release element 18 is effected by manually upwardly pivoting handle 26 about its pivotal connection 27 to the upper end of outer member 5 until it reaches the position shown in phantom. The underside strike portion 28 of handle 26 extending through aperture 29 in the upper end portion of outer member 5 thereby downwardly engages against a threaded strike pin 30 upwardly mounted on the end flange 31 at the upper end portion of release element 18 and adjustable in height thereon. In turn, thrust surface 32 contained on the lower end portion of release element 18 so as to define the lowermost or downward terminal portion thereof and positioned at the apex portion 15 of jamming wedge zone 14 in overlying relation to jamming element 17 is independently downwardly displaced into moving contact with the jamming element. This serves to urge the jamming element downwardly out of unilateral jamming engagement against the force of biasing spring means 19.

By adjusting the normal upper position of strike pin 30 on end flange 31 relative to the normal horizontal position of underside portion 28, the linear range or extent of the downward displacement of release element 18 during ordinary displacement of handle 26 can be conveniently controlled. The spring means 19 effectively independently serves to urge the jamming element 17 into desired jamming engagement and to oppose downward movement of thrust surface 32, whereas the carrier means 22 and lug 20 serve to limit such downward movement by abutment with each other when thrust surface 32 forces jamming element 17 to utilize or absorb to the maximum the available biasing spring force of the spring means. In normal locking position, thrust surface 32 simply rests on the top side of jamming element 17 as the wedge zone engagement is sufficient to support the static weight of release element 18. However, once handle 26 is operated, independent downward movement of thrust surface 32 is opposed by spring means 19.

It will be appreciated that the locking system shown is actually a downwardly self-locking and upwardly self-releasing system due to the very nature and orientation of the wedge zone and coacting jamming element. Thus, upward pull on the table top portion 2 or upper member 5 will cause wedge surface 12 to move continually outwardly of the nip or apex portion of the wedge zone in relation to contact surface 7 and jamming element 17, and in turn the upper member to move upwardly along the lower member 6, thereby selectively raising the table height without the need for operating the handle 26 or moving the thrust surface 32 of release element 18 downwardly against the jamming element. Upon termination of such upward pull, the spring means 19 will again force jamming element 17 into unilateral engagement at the apex portion of the wedge zone 14 to lock the members and prevent any reverse or downward movement of upper member 5 or decrease in table height.

By providing the jamming element advantageously in the form of a roller or cylinder as compared to a simple wedge of similar triangular orientation to that of the wedge zone, the roller will conveniently roll upwardly on contact surface 7 under the independent biasing force of spring means 19 in essentially friction-free and effortless manner as wedge surface 12 moves continuously upwardly with upper member 5, and will immediately again lock in place in desired jamming engagement upon termination of such upward pull.

In any case, corresponding independent downward movement of release element 18 under the influence of handle 26 will force jamming element 17 to slide or roll as the case may be downwardly on contact surface 7 against the force of spring means 19 to release such unilateral engagement and unlock the members. This in turn will permit upper member 5 to move downwardly along lower member 6, thereby selectively lowering the table height. Upon release of handle 26, spring means 19 will effectively independently urge jamming element 17 back into unilateral engagement to relock the members against further downward movement of upper member 5.

At the same time, jamming element 17, which is preferably always maintained in more or less constant upward contact with thrust surface 32 in any position of movement of jamming element 17 and release element 18, due to the upwardly biasing independent force of spring means 19 opposing the downward gravity force of the freely slidably suspended release element 18 in generally resting contact at thrust surface 32 on the jamming element, will force release element 18 back to its normal upper or unlocking position. By appropriate provision for resiliently pivotally mounting handle 26 at pivotal connection 27 such as by way of conventional biasing spring means or the like (not shown), handle 26 will correspondingly return to its normal horizontal or unlocking position upon termination of the downward manual force used to operate release element 18 in the manner described above.

Opposed antifriction guide bearing means, such as in the form of smooth box-like guide bearing inserts 33 and 34 of molded nylon or other plastic material, are desirably interposed operatively in the clearance gap between the outer and inner members 5 and 6 at the corresponding facing end portions 9 and 10 for guiding the members in conventional manner for relative axial movement.

Bottom female guide bearing insert 33 is mounted on the interior wall 8 of outer member 5 at facing end portion 9 via screws 35 or the like, and conveniently includes a tapered mounting pocket 36 in which wedge plate 13, and in turn jamming element 17 and spring means 19 carried thereat, are accommodated. These components are mounted in pocket 36 via the positioning arm 37 interconnecting wedge plate 13 to guide bearing insert 33 so as to permit the bottom end of wedge plate 13 to seat against the downwardly facing end edge of the outer member 5 thereat for more complete overall reinforcement of the connection between the components in question.

Hence, guide insert 33 may be efficiently assembled and disassembled with respect to outer member 5 by merely screwing or unscrewing the screws 35 in place. In this operation, the wedge plate 13, spring means 19, carrier means 22 and jamming element 17 are correspondingly assembled and disassembled therewith, provided that these components are prearranged in pocket 36 and interconnected via positioning arm 37 to guide insert 33 thereat. These parts together accordingly constitute a separate unit which may be easily removably mounted on the outer member facing end portion 9 to facilitate assembly and disassembly of the parts.

Top male guide bearing insert 34 is mounted on the external wall of inner member 6 at facing end portion 10. In fact, guide bearing insert 34 is a composite insert composed of a pair of remotely facing opposed box-like inner member sub-insert portions 34a and 34b removably inserted in corresponding remotely facing large square or rectangular seating holes or recesses 38a and 38b provided in end portion 10 for operatively seating the same thereat. Appropriate attachment screws 39a and 39b are provided to affix guide sub-insert portions 34a and 34b in place in inner member seating recesses 38a and 38b.

Advantageously, substantially constant force or zero gradient type coil spring means of the conventional kind, e.g. constant tension negator springs, may also be operatively interposed between the members 5 and 6. These may include a corresponding pair of remotely facing or opposed constant force coil springs 40a and 40b respectively having coil ends 41a and 41b and free ends 42a and 42b. The coil ends 41a and 41b may be suitably rotatably mounted on remotely facing opposed spools 43a and 43b operatively journally received in corresponding receiving pockets or retaining receptacles 44a and 44b in turn provided in sub-insert portions 34a and 34b (see FIG. 3) located at the inner member facing end portion 10. The free ends 42a and 42b, on the other hand, may be simply attached to the corresponding opposed directly facing mounting seats 45 on the outer member facing end portion 9, e.g. by appropriate screw and nut connections 46.

In this manner, coil springs 40a and 40b will maintain outer and inner members 5 and 6 in counterbalancing relation under constant force or tension in any overlapping position of movement of the members to permit adjustment of their overall effective length and in turn the overall height of the table with minimum effort upon release of the jamming means. At the same time, the guide bearing inserts 33 and 34 will smoothly guide the members for relative axial movement in the known manner, i.e. the suitably perimetrically dimensioned outwardly directed box-like sub-insert portions 34a and 34b at the top of the inner or lower member 6 will slidingly engage the adjacent portion of the internal wall of the outer or upper member 5 while the correspondingly suitably dimensioned inwardly directed box-like insert 33 at the bottom of the outer or upper member 5 will slidingly engage the adjacent portion of the external wall of the inner or lower member 6.

It will be appreciated that guide insert 34 in the form of box-like sub-insert portions 34a and 34b may also be efficiently assembled and disassembled with respect to inner member 6 by merely screwing and unscrewing the appropriate screws 38a and 39b in place, i.e. preferably prior to attaching or detaching as the case may be the coil spring free ends 42a and 42b via screw and nut connections 46, to mounting seats 45 on outer member facing end portion 9. Accordingly, the sub-insert portions 34a and 34b may be individually removed from seating recesses 38a and 38b in inner member 6, as desired. Since coil springs 40a and 40b are prearranged on removably mounted spools 43a and 43b in receptacles 44a and 44b in such sub-insert portions 34a and 34b, these respective parts together accordingly constitute in each instance a concordant separate unit which may be easily removably mounted on the inner member facing end portion 10 to facilitate assembly and disassembly of the parts.

Thus, a system is provided in which the antifriction guide bearing means may conform in cross sectional guiding configuration to that of the coacting part of the opposed member with which it is to be maintained in smooth sliding relation. Appropriately, the outer and inner members 5 and 6 may be fashioned as squared off or rectangular box-like tubular members, and in turn the guide bearing means will be complementally constituted for operative interposition therebetween for the desired purposes. This arrangement is particularly purposeful for accommodating as well the conventional constant force or tension coil spring means, and by specific selection of the conformation of the guide bearing means in relation to the constant force coil spring means on the one hand and the jamming means on the other, these parts may be removably mounted as corresponding separate units on the members as the case may be.

It will be realized that the jamming element 17 is appropriately arranged in the assembly with respect to the wedge plate 13 and its wedge surface 12 as well as with respect to release element 18, so as to be rotatably and/or linearly upwardly and downwardly movable as the case may be, independently of the wedge surface 12, contact surface 10 and release element 18, and at the same time normally resiliently upwardly biased independently of the release element 18 into unilateral jamming engagement between wedge surface 12 and contact surface 10. This will jam the outer and inner members 5 and 6 against further corresponding relative movement therebetween in a direction of increasing overlapping extent and in turn of decreasing overall height of the table.

Also, in this regard, the release element 18 is itself downwardly movable independently of the jamming element 17 for releasably urging the jamming element out of such unilateral jamming engagement. This will unlock the outer and inner members 5 and 6 to permit further corresponding relative movement therebetween in such direction of increasing overlapping extent and in turn of decreasing overall table height.

According to the present invention, therefore, an extensible support assembly is advantageously provided, such as may be incorporated in a table assembly or the like, e.g. an overbed or cantilevered table assembly, which contains particularly oriented releasable unidirectional jamming means, and which is simple, durable and inexpensive in construction. As the artisan will appreciate, the instant system may be readily fabricated from commercially available parts and materials using conventional steps and equipment with minimum modification. The resulting assembly is clearly convenient to use as well as sure and safe in operation.

Especially considering the arrangement of the antifriction guide bearing means and the ready accommodation therein of the jamming means and constant force coil spring means, the instant construction advantageously permits easy and economical assembly initially as well as disassembly for repair and servicing when in use. Such construction is long-lasting and stable in operation. Indeed, the permitted incorporation into the overall assembly of supplemental mechanisms by use of functionally efficient mounting components readily adaptable to the constructional confines of the assembly, represents a further beneficial execution and conjoint advantage of the instant assembly system.

In one rather simple form of execution of the invention from a very practical standpoint, a constant tension coil spring actuated overbed table is provided in which the high-low travel is accomplished by an inner tube and an outer tube in coacting telescoping engagement, using molded nylon or the like type antifriction guide bearings correspondingly at the top of the inner tube and at the bottom of the outer tube to insure smooth sliding telescoping action between the tubes. By making the top inner tube bearing as a pair of oppositely facing sub-bearings in such manner that they may be inserted into corresponding large squared off recess holes in the top of the inner tube, these sub-bearings may advantageously at the same time also be provided with corresponding receiving pockets or receptacles therein to contain an appropriate pair of constant tension coil springs.

Appropriate balance and smooth guiding action are assured by inclusion of such remotely facing pairs of sub-bearings and constant tension coil springs at the top of the inner tube, in conjunction with an appropriate separate bearing at the bottom of the outer tube and the attachment of the free ends of the constant tension coil springs at such bottom of the outer tube, e.g. by simple screw and nut connections. The constant tension coil springs are desirably chosen to possess such force as to equal approximately the weight of the top section of the table yet in any case preferably their force will not be enough to lift the table i.e. under their own corresponding spring power alone.

In any case, the instant jamming device required to prevent the table from coasting downward and to support service weight operatively on the table top, is advantageously provided as a simple and readily releasable jamming means, contemplating a single roller forced to jam between the adjacent wall of the inner tube and an inclined or tapered wedge surface operatively supported by the outer tube, and being independently spring loaded by an interposed roller spring so as to be urged into the tapered or wedge shaped locking zone for normally unilaterally locking the table in whatever position it happens to be in at the time. The release means for unlocking the roller from jamming engagement advantageously comprises in turn a single bar bearing on the top of the jamming roller and extending to the top of the table where it is arranged for contact by a manual release handle, so that upon lifting the handle, the release bar is independently forced downwardly and causes the roller element to move out of wedging engagement, thereby permitting the table to move up or down as desired with very little touch.

Of course, it will be appreciated that the table may be raised in the usual way at any time without releasing the handle, because the outer tube in the up direction constantly moves in a direction away from the taper or wedge engagement disposition relative to the roller element and adjacent wall of the inner tube. Thus, it is only necessary to use the release handle when the table is to be lowered.

By containing the roller element, wedge plate and roller spring in the molded plastic bearing at the bottom of the outer tube, and similarly by containing the constant force coil springs in the pair of plastic bearings or sub-bearings at the top of the inner tube, a very economical and very functional arrangement is attained. These various parts are readily fabricated, assembled and incorporated to form a high-low table, permitting ready disassembly for repair and servicing.

In any event, the jamming element is appropriately independently spring urged into unilateral wedging engagement to lock the members without the need for preloading the release element, and may be moved independently of the release element or of the movement, e.g. upwardly, of the release element, not being captively retained thereby. On the other hand, the release element is similarly movable independently of the jamming element or of the movement of the jamming element, e.g. downwardly, whereby to permit unlocking of the members by downwardly urging the jamming element out of unilateral wedging engagement and in counterforce relation to the spring force normally urging the jamming element into such unilateral engagement.

It will be appreciated that the instant specification and drawings are set forth by way of illustration and not limitation, and that various modifications and changes may be made therein without departing from the spirit and scope of the present invention which is to be limited solely by the scope of the appended claims.

What is claimed is:

1. Extensible support assembly adapted to be incorporated in a table assembly or the like, comprising
   a pair of cooperating axially overlapping support members arranged for relative axial movement therebetween to change their overlapping extent and in turn their overall effective length,
   a substantially axially extending contact surface on one of the members, and
   releasable unidirectional jamming means operatively interposed between the members, including an inclined wedge surface on the other of the members in opposed relation to the contact surface and forming a jamming wedge zone with the contact surface, a movable jamming element disposed operatively in the jamming wedge zone, and a movable release element disposed operatively adjacent to the jamming element,
   the jamming element being movable independently of the wedge surface, contact surface and release element, and being normally resiliently directly biased independently of the release element into unidirectional jamming engagement in direct contact between the wedge surface and the contact surface for jamming the members against further corresponding relative movement therebetween, and
   the release element being movable for releasably urging the jamming element out of such unilateral jamming engagement to permit further corresponding relative movement between the members.

2. Assembly according to claim 1 wherein the jamming element is in the form of a jamming roller element.

3. Assembly according to claim 1 wherein the members are disposed in telescoping relation.

4. Assembly according to claim 1 wherein the members are provided with corresponding facing end portions, opposed antifriction guide bearing means are operatively interposed between the members on the corresponding facing end portions for guiding the members for relative axial movement, and the wedge surface and jamming element are mounted on the guide means on one of such facing end portions.

5. Assembly according to claim 4 wherein substantially constant force coil spring means correspondingly having a coil end and a free end are operatively interposed between the members with the corresponding free end mounted at such one of the facing end portions and the corresponding coil end mounted on the guide means on the other of the facing end portions for maintaining the members in counterbalancing relation in any overlapping position of movement therebetween to permit adjustment of their overall effective length with minimum effort upon release of the jamming means.

6. Assembly according to claim 5 wherein the guide means on the other of the facing end portions contain receiving means therein operatively receiving the corresponding coil end of the coil spring means.

7. Assembly according to claim 6 wherein the opposed guide means are removably mounted as corresponding units on the members to facilitate assembly and disassembly of the wedge surface and jamming element at such one of the facing end portions and the corresponding coil end of the coil spring means at the other of the facing end portions.

8. Assembly according to claim 7 wherein the coil spring means include a pair of remotely facing substantially constant force coil springs having corresponding coil ends and free ends, the receiving means include a pair of correspondingly remotely facing receptacles and the coil springs are operatively interposed with the corresponding coil ends thereof operatively receiving respectively in the receptacles and the corresponding free ends thereof operatively mounted respectively on such one of the facing end portions.

9. Assembly according to claim 8 wherein the members are disposed in telescoping relation with the opposed guide means and the constant force spring means interposed therebetween.

10. Assembly according to claim 9 wherein the jamming element is in the form of a jamming roller element and resilient biasing means are operatively directly interposed between the other of the members and the jamming roller element independently of the release element for normally resiliently directly biasing the jamming element into unidirectional jamming engagement in direct contact between the wedge surface and the contact surface.

11. Assembly according to claim 1 wherein resilient biasing means are operatively directly interposed between the other of the members and the jamming element independently of the release element for normally resiliently directly biasing the jamming element into unidirectional jamming engagement in direct contact between the wedge surface and the contact surface.

12. Assembly according to claim 11 wherein the resilient biasing means include biasing spring means carried on the other of the members remote from the release element and disposed in the jamming wedge zone in operative contact with the jamming element.

13. Assembly according to claim 12 wherein the jamming element is in the form of a jamming roller element and carrier means are disposed on the biasing spring means for displaceably carrying the jamming element for independent rotational movement of the jamming element with respect to the carrier means and for conjoint linear movement of the jamming element and the carrier means correspondingly for moving the jamming element into unidirectional jamming engagement between the wedge surface and the contact surface under the force of the biasing spring means and out of such unilateral jamming engagement under the releasably urging counterforce of the release element.

14. Assembly according to claim 1 wherein the jamming element is disposed to prevent relative movement of the other of the members in an axial direction from the corresponding inward apex portion of the jamming wedge zone to the corresponding outward base portion thereof.

15. Assembly according to claim 14 wherein the jamming element is disposed to prevent further relative movement of the members in a direction of increasing overlapping extent and in turn of decreasing overall effective length.

16. Overbed table assembly comprising
a top table portion and a bottom stand portion substantially vertically interconnected by a pair of cooperating upper and lower vertical telescoping support members arranged for relative axial movement therebetween to change their overlapping extent and in turn their overall effective length and the corresponding height of the table,
the upper member carrying the top table portion thereon, and the lower member having a substantially axially extending contact surface thereon and being carried on the bottom stand portion, and
releasable unidirectional jamming means operatively interposed between the members, including an inclined wedge surface on the upper member situated generally in a plane angularly crosswise of the axis of the members and in opposed relation to the contact surface and forming a jamming wedge zone with the contact surface having an upwardly directed inward apex portion and a downwardly directed outward base portion in any selective overlapping position of relative axial movement of the members, a movable jamming roller element disposed operatively in the jamming wedge zone, and a movable release element disposed operatively adjacent to the jamming element,
the jamming element being rotatably and linearly upwardly and downwardly movable independently of the wedge surface, contact surface and release element, and being normally resiliently directly biased independently of the release element upwardly into unidirectional jamming engagement in direct contact between the wedge surface and the contact surface for jamming the members against further corresponding relative movement therebetween in a direction of increasing overlapping extent and in turn of decreasing overall height of the table, and
the release element being downwardly movable independently of the jamming element for releasably urging the jamming element out of such unilateral jamming engagement to permit further corresponding relative movement between the members in such direction of increasing overlapping extent and in turn of decreasing overall height of the table.

17. Assembly according to claim 16 wherein biasing spring means are carried on the upper member and disposed in the jamming wedge zone in operative direct contact with the jamming element independently of the release element for normally resiliently directly biasing the jamming element into unidirectional jamming engagement in direct contact between the wedge surface and contact surface.

18. Assembly according to claim 17 wherein the jamming element is operatively displaceably carried on the biasing spring means for independent rotational movement of the jamming element with respect to the biasing spring means and for conjoint linear movement thereon correspondingly for movement of the jamming element upwardly into unidirectional jamming engagement between the wedge surface and contact surface under the force of the biasing spring means and downwardly out of such unilateral jamming engagement under the releasably urging counterforce of the release element.

19. Assembly according to claim 18 wherein the release element is displaceably mounted on the upper member for downward movement relative thereto, and a handle is displaceably disposed on the upper member and arranged for downwardly moving the release element independently of the jamming element for releasably urging the jamming element out of unilateral jamming engagement.

20. Assembly according to claim 19 wherein the release element is provided with a lower end portion containing a thrust surface defining the lowermost portion thereof displaceably positioned at the apex portion of the jamming wedge zone in overlying relation to the jamming element for releasably urging the jamming element downwardly out of unilateral jamming engagement.

21. Assembly according to claim 20 wherein carrier means are disposed on the biasing spring means for displaceably carrying the jamming roller element for independent rotational movement of the jamming element with respect to the carrier means and biasing spring means and for conjoint linear movement of the jamming element and the carrier means on the biasing spring means correspondingly for movement of the jamming element upwardly into unidirectional jamming engagement between the wedge surface and the contact surface under the force of the biasing spring means and downwardly out of such unilateral jamming engagement under the releasably urging counterforce of the release element.

22. Assembly according to claim 17 wherein the members are provided with corresponding facing end portions, opposed antifriction guide bearing means are operatively interposed between the members on the corresponding facing end portions for guiding the members for relative axial movement, and the wedge surface, jamming element and biasing spring means are mounted on the guide means on the upper member facing end portion.

23. Assembly according to claim 22 wherein the guide means on the lower member facing end portion contain receiving means therein and the upper member facing end portion contains mounting seat means thereon, and substantially constant force coil spring means correspondingly having a coil end and a free end are operatively interposed between the members with the corresponding free end operatively mounted on the mounting seat means and the corresponding coil end operatively received in the receiving means for maintaining the members in counterbalancing relation in any overlapping position of movement therebetween to permit adjustment of their overall effective length and in turn the overall height of the table with minimum effort upon release of the jamming means.

24. Assembly according to claim 23 wherein the opposed guide means are removably mounted as corresponding units on the members to facilitate assembly and disassembly of the wedge surface, jamming element and biasing spring means at the upper member facing end portion and the corresponding coil end of the coil spring means at the lower member facing end portion.

25. Assembly according to claim 24 wherein the coil spring means include a pair of remotely facing substantially constant force coil springs having corresponding coil ends and free ends, the receiving means include a pair of correspondingly remotely facing receptacles and the mounting seat means include a pair of correspondingly opposed mounting seats, and the coil springs are operatively interposed with the corresponding coil ends thereof operatively received respectively in the receptacles and the corresponding free ends thereof operatively mounted respectively on the mounting seats.

* * * * *